Feb. 2, 1960  E. P. HARRIS ET AL  2,923,029
FOAM RUBBER STRIP MANUFACTURING PROCESS
Filed April 15, 1954
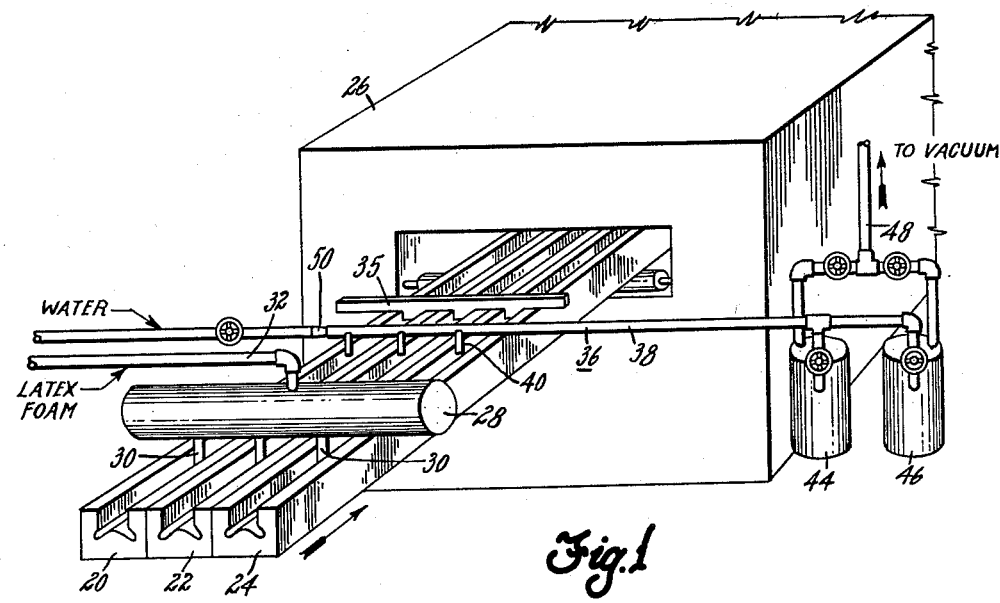
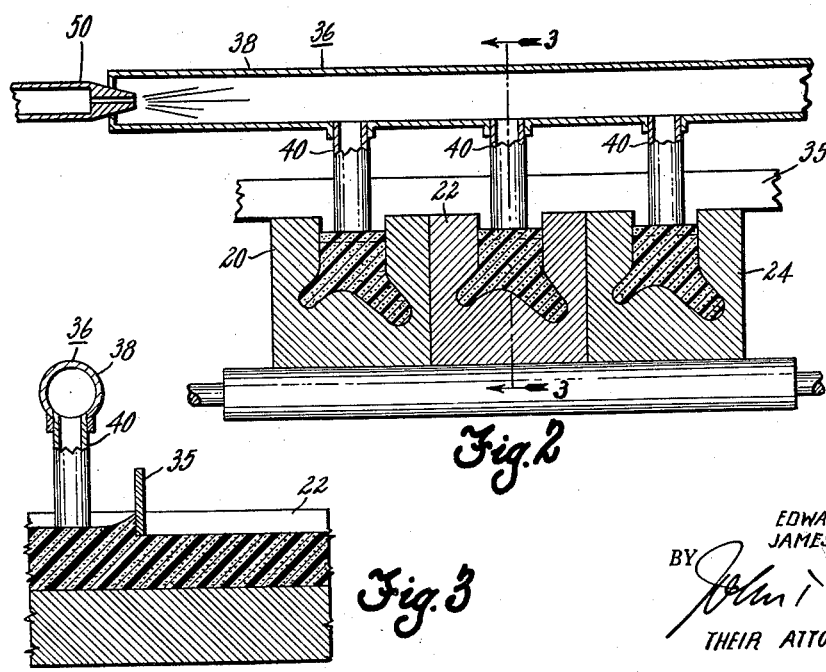
INVENTORS
EDWARD P. HARRIS
JAMES R. WALL
THEIR ATTORNEY

United States Patent Office 2,923,029
Patented Feb. 2, 1960

2,923,029

FOAM RUBBER STRIP MANUFACTURING PROCESS

Edward P. Harris and James R. Wall, Dayton, Ohio, assignors to General Motors Corporation, Detroit, Mich., a corporation of Delaware Application April 15, 1954, Serial No. 423,419

1 Claim. (Cl. 18—1)

This invention relates to the manufacture of foamed rubberlike articles and is particularly concerned with the manufacture of foam rubber strip material.

The present invention is directed to processing methods to be used in connection with methods for continuously manufacturing strip material from foamed latex. Some of these methods are disclosed in applications, Serial Nos. 404,554, filed on January 18, 1954, and 404,556 filed on January 18, 1954, and now abandoned, assigned to the assignee here. In these applications, the molds which are continuously fed into the curing oven, are filled from a manifold with foamed latex. Due to the speed of travel, the pressure on the foamed latex, etc., it is very difficult to predetermine the continuous filling of the mold cavity whereby it is the general practice to overfill the cavity and then to scrape off the excess foam to a desired level therein prior to either closing the cavity or curing the foam in the cavity while open. This scraping has been accomplished by the use of a doctor blade in past methods which merely backs up the foam and smooths it out to the desired level. This procedure, while satisfactory for the most part, will build up the excess foam which then overflows the cavity.

The present invention is directed to a method for predetermining continuously the fill in a mold cavity wherein the fill is accurately leveled to a desired quantity and wherein any desired portion of the excess foam is entirely removed from the cavity whereupon it may be reclaimed.

It is therefore a primary object of the invention to provide a method for continuously removing excess foam from a continuously moving mold cavity for predetermining the level of foam in said cavity.

In carrying out the above object, it is a further object to utilize a vacuum apparatus including a tube extending into the cavity and adjusted to the desired level whereby any excess foam passing the tube is drawn off.

A still further object of the invention is to utilize a vacuum device, properly positioned with respect to a moving mold cavity, for drawing off excess foam therein wherein a jet of water or other diluent is used in connection with the device for diluting the latex foam and flushing the foam from the device.

A still further object of the invention is to use a doctor blade to level the foam in a moving mold cavity and to provide a vacuum device posterior thereto for continuously removing desired quantities of excess foam.

Further objects and advantages of the present invention will be apparent from the following description, reference being had to the accompanying drawing, wherein preferred embodiments of the present invention are clearly shown.

In the drawing:

Fig. 1 is a diagrammatic view perspectively illustrating a plurality of molds moving into an oven and showing the feeding and leveling devices for the latex foam.

Fig. 2 is a view in section taken through the leveling device shown in Fig. 1.

Fig. 3 is a section on line 3—3 of Fig. 2.

As hereinbefore noted, in the continuous molding of latex foam, it is desirable to slightly overfill the mold cavity to insure a complete fill for the molding operation. This necessitates the leveling off of the foam in the cavity prior to the time that it is cured which is usually accomplished by means of a doctor blade. This type of leveling requires constant inspection and periodic manipulation of the controls in order to maintain the proper fill within the molds. The present invention overcomes these past difficulties by making the filling operation fully automatic whereby inspection and variation of control is unnecessary.

In Fig. 1, three molds, preferably made of aluminum, are shown at 20, 22, and 24 moving into a curing oven 26. The molds are preferably doweled together and come in predetermined lengths wherein additional lengths of the mold are periodically joined to the ends of the molds shown so that for all intents and purposes, the mold cavities are of continuous and indeterminate length. Latex is flowed into each of the mold cavities through a manifold 28 having a plurality of supply tubes 30 branching off therefrom and extending into the cavities of the molds 20, 22 and 24. Each of the tubes 30 may be controlled by suitable valve means, not shown, so that a substantially uniform fill controlled flow is obtained. The latex foam enters the manifold 28 through a pipe 32 that connects with a continuous foamer (not shown). The latex foam coming from the foamer is fully compounded and includes a gelling agent or delayed coagulant. The fill of the mold cavities is, as hereinbefore mentioned, maintained slightly above the quantity of foam desired so that there is always an excess of foam in the cavities after passing the supply tubes 30. This assures that the cavities are completely full. As the molds 20, 22 and 24 continue to move toward the oven 26 with the latex foam therein, they must pass a vacuum apparatus 36 shown in more detail in Fig. 2.

In this instance, a manifold 38 is provided which has a plurality of downwardly extending tubes 40 thereon. Manifold 38 connects to either one of two vacuum tanks 44 and 46 spaced remote from the manifold which are connected by means of a pipe 48 to a vacuum pump, not shown. Pipe 48 is branched and valved so that either of the tanks 44 or 46 may be placed in operation. The manifold 38 is also valved as it passes into the tanks so that the tanks 44 and 46 may be used alternately. That is to say, when one tank is full, the valves are manipulated so that the other tank takes over and the first tank may be emptied of its contents. By alternating the operation of the two tanks, it is therefore possible to maintain the apparatus in continuous operation.

The downwardly extending tubes 40 pass downwardly into the cavities in molds 20, 22 and 24 and have their open ends spaced a predetermined distance therein whereby the level of latex may be maintained at this point. This is explained by the fact that the tubes 40 are all connected by the manifold and pipes to the vacuum pump whereby any latex foam in the cavities, which is above the inlet ends of the tubes, is drawn off to the level of the ends of the tubes whereby no foam in excess of the desired quantity passes the tubes as the molds move toward the oven. The capacity of the vacuum pump is sufficient so that even though two mold cavities are leveled, the third will still draw excess foam and this condition is maintained irrespective of the number of cavities by proper choice of tube size, vacuum pump capacity, etc. In some instances and particularly when a heavy foam (not readily flowable) is used a doctor blade 35 may be provided. In this case, the tubes 40 are placed slightly above the desired level of foam in the cavities and the blade 35 is spaced between the vacuum apparatus and the oven 26. The blade 35 levels off the foam and as the excess foam builds up behind the blade, it is drawn off through the tube 40.

Thus either modification can be used to level this foam and the proper choice of method should be determined for the particular foam being used, since, if the foam is freely flowable, the doctor blade is not generally necessary.

As the latex foam is drawn into the manifold 38, it flows therealong into the tanks 44 or 46. However, as the foam is viscous and includes a gelling agent, a portion of this foam will adhere to the walls of the manifold and within a predetermined time period will tend to gel, thereby gradually closing up the tube and making the apparatus inoperative. In order to eliminate this condition, a jet or nozzle 50 is positioned at the closed end of the manifold, which jet supplies water under pressure to the manifold. The water is supplied in controlled quantities and flows toward the vacuum tanks by virtue of its own injection and the vacuum imposed upon the manifold. This water is sufficient to dilute the latex foam and thereby slow up the action of the gelling agent and likewise the water tends to wash down the inside of the manifold and thereby prevent any foam adhering to the walls thereof. In this manner, all of the foam is drawn into the vacuum tanks 44 or 46 where it is held in dilute condition and where it may be coagulated by the addition of acid or alkali to change the pH of the solution. The coagulated latex may be removed and reclaimed into sheet or other suitable form.

It is apparent that the present invention eliminates the problem normally present when the molds are to be accurately filled since the vacuum tubes constantly draw off any excess foam in accordance with the position of the tubes. Similarly, as soon as the level is reached, the vacuum on the tube is broken to the atmosphere whereby no more latex is drawn therefrom. In this manner, the device is more or less self-adjusting and therefore is fully automatic. The use of the water jet 50 is an important part of this invention since when this jet is not in use, the entire device and method fails after an extended period of operation. However, with the jet it is possible to maintain the apparatus in satisfactory useful condition continuously.

While the embodiments of the present invention as herein disclosed, constitute preferred forms, it is to be understood that other forms might be adopted.

What is claimed is as follows:

In a process for continuously molding a latex foam body within an endless moving mold having a continuous opening above the mold, the steps of; continuously injecting uncured freely flowable latex foam into the said moving mold in excess quantity to prevent the formation of voids on the upper surface of the cured latex product, shaping the latex foam within the mold at a point posterior to the point of supply by continuously applying an inlet of a partial vacuum carrying conduit at a position to remove said flowable foam latex above a desired level, and curing the latex remaining in the mold at a point posterior to the point of vacuum removal.

References Cited in the file of this patent

UNITED STATES PATENTS

| | | |
|---|---|---|
| 1,635,834 | Goldsmith | July 12, 1927 |
| 2,327,001 | Schott | Aug. 17, 1943 |
| 2,549,864 | Toulmin | Apr. 24, 1951 |
| 2,586,275 | Toulmin | Feb. 19, 1952 |
| 2,689,974 | Meyer | Sept. 28, 1954 |
| 2,719,830 | Flood et al. | Oct. 4, 1955 |
| 2,725,113 | Fagyas | Nov. 29, 1955 |